US012120784B1

(12) United States Patent
Dyck

(10) Patent No.: US 12,120,784 B1
(45) Date of Patent: Oct. 15, 2024

(54) GARAGE DOOR THRESHOLD WARMER

(71) Applicant: Stephen Wade Victor Dyck, Niverville (CA)

(72) Inventor: Stephen Wade Victor Dyck, Niverville (CA)

(*) Notice: Subject to any disclaimer, the term of this patent is extended or adjusted under 35 U.S.C. 154(b) by 0 days.

(21) Appl. No.: 18/643,292

(22) Filed: Apr. 23, 2024

(51) Int. Cl.

| | |
|---|---|
| ***H05B 3/18*** | (2006.01) |
| ***E06B 7/23*** | (2006.01) |
| ***H01H 1/06*** | (2006.01) |
| ***H01H 1/38*** | (2006.01) |
| ***H01H 3/16*** | (2006.01) |
| ***H05B 1/02*** | (2006.01) |
| ***H05B 3/56*** | (2006.01) |

(52) U.S. Cl.
CPC ............. *H05B 3/18* (2013.01); *E06B 7/2316* (2013.01); *H01H 1/06* (2013.01); *H01H 1/38* (2013.01); *H01H 3/161* (2013.01); *H05B 1/0202* (2013.01); *H05B 2214/02* (2013.01)

(58) Field of Classification Search
None
See application file for complete search history.

(56) References Cited

U.S. PATENT DOCUMENTS

| | | | | |
|---|---|---|---|---|
| 6,397,919 B1 * | 6/2002 | Lamsfuss | F25D 23/021 62/275 |
| 2018/0248349 A1 * | 8/2018 | Reed | H05B 3/18 |
| 2023/0116258 A1 * | 4/2023 | Wright | E06B 7/2316 49/493.1 |

FOREIGN PATENT DOCUMENTS

| | | |
|---|---|---|
| CN | 200975195 Y | 11/2007 |
| CN | 201908461 U | 7/2011 |
| CN | 203531695 U | 4/2014 |
| DE | 20012201 U | 10/2000 |
| DE | 10327339 A1 | 2/2005 |

OTHER PUBLICATIONS

Door Frame and Door Reveal Heaters Door Frame Heating & Reveal Heating https://pro-therm.de/en/door-frame-heating-reveal-heating.html Feb. 15, 2024.
E-Tec's Door Heating System Door Heating http://www.ehtsystem.com/en/enai-system/door-heating/ Feb. 15, 2024.

* cited by examiner

*Primary Examiner* — Joseph M. Pelham
(74) *Attorney, Agent, or Firm* — Argus Intellectual Enterprise, LLC; Daniel Enea; Jordan Sworen

(57) ABSTRACT

A garage door threshold warmer is provided. The garage door threshold warmer includes an electric heating element positioned within a seal that is securable at the lower end of a garage door. The heating element is designed to prevent the seal from freezing to the garage floor in cold climates, thus minimizing damage to the garage door and maintaining an effective seal against snow entry. The heating element is in electronic communication with a power source via a wire system that includes mating first and second connectors for ease of disconnection and reconnection as the garage door moves between an open and closed position, respectively. This automatic disconnection and reconnection mechanism engages as the garage door opens and closes to ensure that the heating element is only activated when the door is closed.

13 Claims, 3 Drawing Sheets

GARAGE DOOR THRESHOLD WARMER

BACKGROUND OF THE INVENTION

The present invention relates to a garage door threshold warmer designed to prevent a seal of a garage door from freezing to the floor of the garage. More specifically, the invention provides a heating element within the seal that keeps the temperature above freezing at the seal and is only activated when the garage door is closed. The configuration of the wire connectors allows for unrestricted opening and closing of the garage door without requiring a user to manually disconnect and connect the heating element every time the garage door is used.

Garage doors represent a critical juncture between a home's interior and the external environment. Particularly in regions experiencing freeze-thaw cycles, homeowners face the recurrent problem of garage door seals freezing to the floor. This issue not only hampers the functionality of garage doors by obstructing smooth operation but also risks significant damage to the garage door structure itself.

Traditional garage doors comprise a bottom seal designed to prevent the ingress of external elements; however, this seal becomes a vulnerability when temperatures drop below freezing. The industry has attempted various solutions to mitigate the freezing problem, including chemical deicers and mechanical devices to break the seal before operation. Chemical deicers, though effective in preventing ice formation, can corrode garage door materials and degrade the integrity of the driveway. Mechanical solutions, on the other hand, require manual intervention or complex modifications to existing door mechanisms, diminishing their practicality for everyday use. Despite these attempts, a significant gap remains for a solution that is both effective in preventing freeze adhesion and seamless in integration with the daily operation of a garage door.

The current invention introduces a garage door threshold warmer that incorporates a heating element within the garage door's bottom seal to directly address the core problem of ice formation without the drawbacks associated with chemical or mechanical interventions. Unlike existing solutions, the garage door threshold warmer operates automatically, engaging when the garage door closes to heat the seal and the immediate ground, thus preventing ice from bonding the garage door to the ground floor. The garage door threshold warmer is not only efficient in its primary function but also preserves the aesthetic and structural integrity of the garage door and surrounding property.

Furthermore, the garage door threshold warmer automatically disconnects when the door opens and reconnects upon closing, ensuring that the system is only active when necessary. This approach circumvents the limitations of previous solutions by offering a passive, automated system that requires no active management by the homeowner.

In light of the devices disclosed in the known art, it is submitted that the present invention substantially diverges in design elements and methods from the known art and consequently it is clear that there is a need in the art for a garage door threshold warmer that offers seamless integration with garage doors and user-friendly solution to a widespread problem. In this regard the instant invention substantially fulfills these needs.

SUMMARY OF THE INVENTION

In view of the foregoing disadvantages inherent in the known types of garage door deicers now present in the known art, the present invention provides a new garage door threshold warmer that heats the threshold to prevent the seal from freezing to the floor without interfering with the normal operation of the garage door.

It is an objective of the present invention to offer a garage door threshold warmer designed to prevent the garage door seal from freezing to the garage floor. This is achieved by incorporating a heating element within the garage door's bottom seal, effectively maintaining the garage door's functionality and integrity during freeze-thaw cycles without the need for manual intervention or chemical deicing agents.

It is a further objective of the present invention to offer a garage door threshold warmer that enhances the energy efficiency of heating the garage door threshold. The system is configured to activate only when the garage door is in a closed position, due to pair of connectors that automatically disconnect when the door opens and reconnects upon closing. This arrangement conserves energy by providing electrical energy to the heating element for heating only when the garage door is closed.

It is yet another objective of the present invention to provide a garage door threshold warmer that is easy to install and does not require significant modifications to the existing garage door infrastructure. The invention is designed to be compatible with standard garage doors by mounting over the brackets and tracks.

It is also an objective of the present invention to offer a garage door threshold warmer that ensures the safety and durability of its components. By integrating the heating element within a seal that is resistant to wear and environmental factors, the invention promises longevity and safe operation.

It is therefore an object of the present invention to provide a new and improved garage door threshold warmer for heating the garage door threshold that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
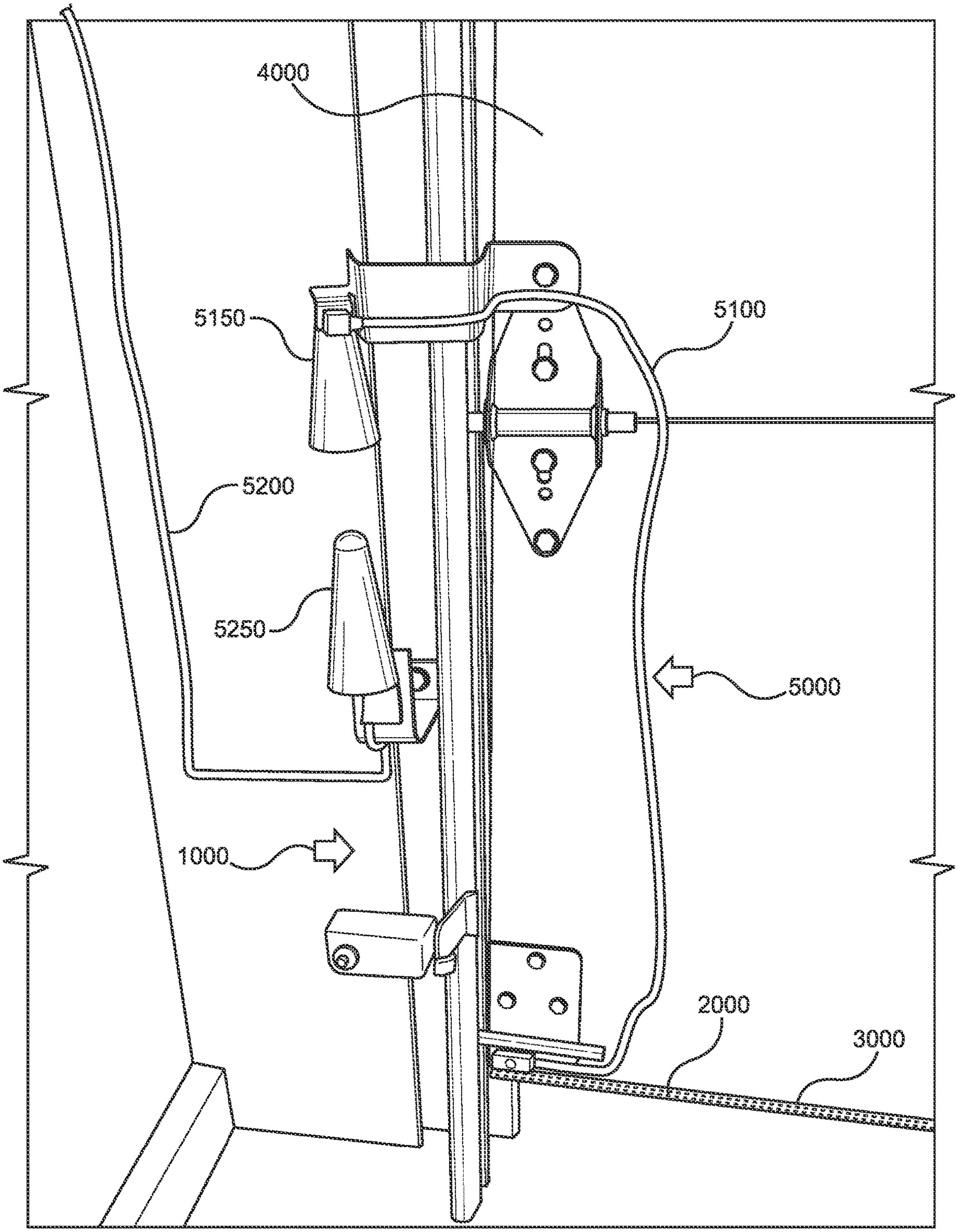
FIG. 1 shows a perspective view of one embodiment of the garage door threshold warmer secured to a garage door in an open configuration.

Reference is made herein to the attached drawings. Like reference numerals are used throughout the drawings to depict like or similar elements of the system. For the purpose of presenting a brief and clear description of the present invention, the embodiment discussed will be used with a garage door having a garage door opener and track for lifting the garage door. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

As used herein "garage door" includes a wide range of doors that open vertically or horizontally and are typically large enough to accommodate vehicles and other large items. This term encompasses not only traditional garage doors used in residential and commercial buildings but also extends to barn doors, shed doors, and similar large doors used in agricultural, industrial, or personal storage applications. The term is meant to cover any door that serves as the main entryway for a structure designed to house, protect, or store vehicles, equipment, or other large items, regardless of the mechanism of opening or the specific use of the building.

Figure 2:
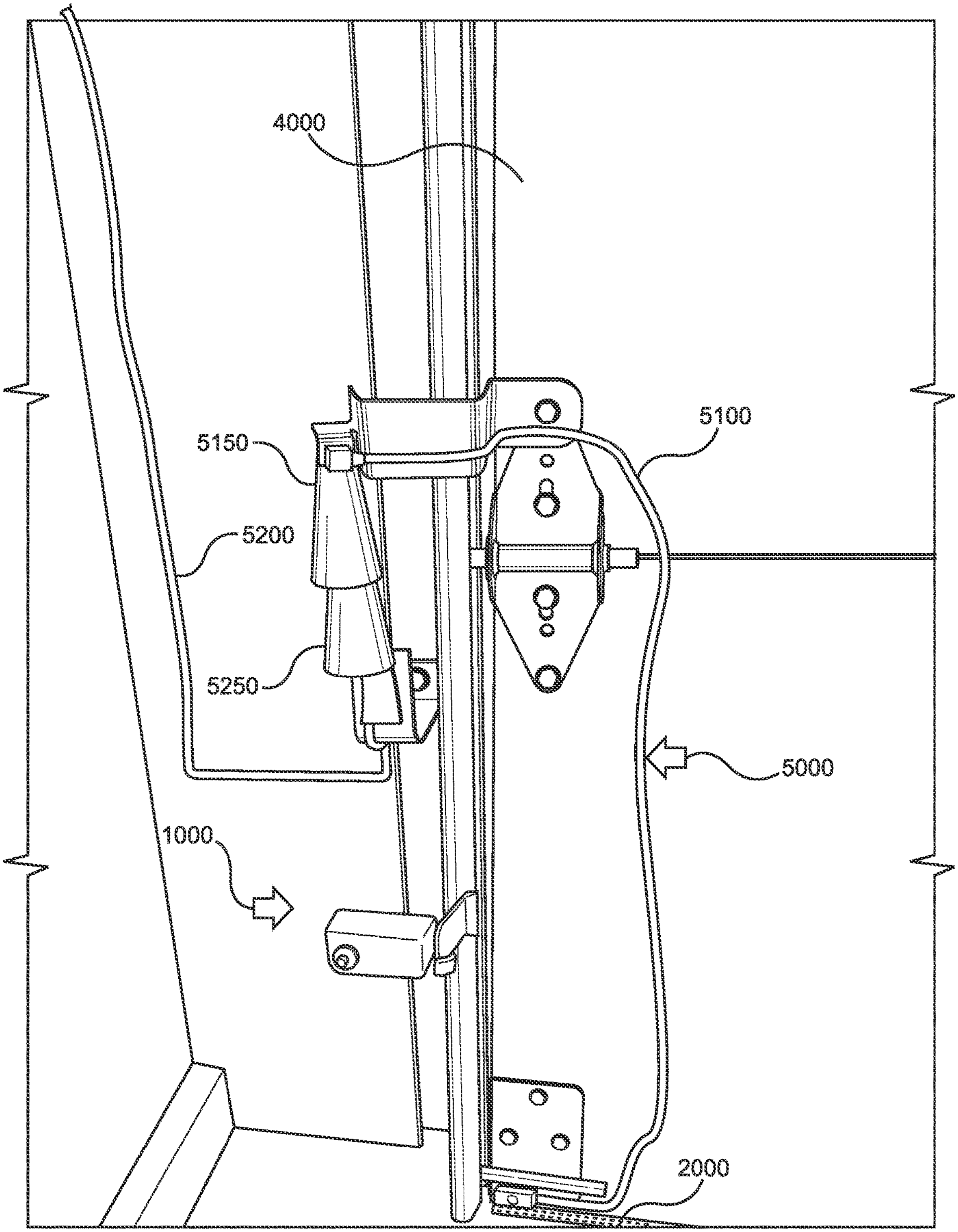
FIG. 2 shows a perspective view of one embodiment of the garage door threshold warmer secured to a garage door in a closed configuration.

Referring to FIGS. 1 and 2, there are shown perspective views of one embodiment of the garage door threshold warmer secured to a garage door in an open configuration and in a closed configuration, respectively. In the shown embodiment, the garage door threshold warmer is adapted to be installed on an interior side of a garage door. The garage door threshold warmer 1000 is configured to prevent the freezing of the garage door seal to the garage floor, particularly in environments experiencing freeze-thaw cycles. The garage door threshold warmer 1000 comprises an electric heating element 2000 positioned within a seal 3000. The seal 3000 is disposed at the lower end of the garage door 4000 and includes a flexible material that deforms when bearing against the floor. When bearing against the floor, the seal 3000 forms an airtight seal between the exterior side of the garage door and the interior side thereof. The seal 3000 includes a hollow interior that spans the width of the garage door 4000. In the shown embodiment, the material for the seal 3000 is a flexible, durable, and heat-resistant polymer, capable of withstanding environmental wear and the compressive force as the garage door closes, thereby ensuring a snug fit against the garage floor. The heating element 2000 is disposed within the seal 3000 or in close proximity thereto, such that the heat generated from the heating element 2000 is transferred to the seal 3000.

In the shown embodiment, a wire system 5000, which includes first and second wires 5100, 5200 are equipped with mating connectors to provide electrical power to the heating element 2000. The first wire 5100 runs from the heating element to a first connector 5150 and the second wire 5200 runs from a power source, such as a wall outlet, to a second connector 5250. The power source is typically the same power outlet used by the garage door opener. The connectors 5150, 5250 are configured for automatic engagement and disengagement as the door opens and closes. The connectors 5150, 5250 are arranged in such a way that they align for repeated engagement and disengagement cycles. In the shown embodiment, the connectors 5150, 5250 are disposed on a same vertical axis, thereby providing for repeated engagement and disengagement as the garage door is opened and closed, respectively. In this manner, the connectors 5150, 5250 ensure that the heating element 2000 is powered only when the door is closed, thus enhancing energy efficiency.

In the shown embodiment, the first connector 5150 is a cone forming a socket or receptable that mates with the second connector 5250 which is a plug, wherein the cone is adapted to fit around the plug to form the electrical connection when the door 4000 is in the closed configuration, as shown in FIG. 2. The garage door 4000 comprises a side bracket having bearings that engage a track mounted along lateral sides of the garage door 4000. The first connector (cone) 5150 is affixed to a garage door's side bracket and the second connector (plug) 5250 positioned on the garage floor, wall, or any surface that aligns with the first connector 5150. In the shown embodiment, the second connector 5250 is affixed to a bracket mounted adjacent to the garage door track. However, in alternative embodiments, the connectors 5150, 5250 may be disposed in different positions and mounting locations provided they are adapted to engage and disengage through the actuation of the garage door 4000.

In the shown embodiment, the configuration of the cone-plug connectors 5150, 5250 provides alignment aids to direct the connectors to mate, even if they are not in perfect alignment. In this way, if one of the cones is misaligned due to misconfiguration of the garage door or the like, the first connector 5150 will still be able to receive the second connector 5250 therein and guide or force the plug to contact or otherwise engage with the socket to ensure an electrical connection. However, in alternative embodiments, the connectors may include various styles such as standard two-prong, three-prong grounded connectors, and other electrical connector types. The three-prong grounded connector embodiment, in particular, offers enhanced safety features, including a grounding pin to prevent electrical shocks and surges.

In yet another embodiment, the connectors comprise transmitter and receiver units for wireless communication and charging. The transmitter unit is connected to a power source and mounted on the stationary side bracket of the garage door mechanism. The receiver, attached to the movable part of the side bracket or directly on the door near the threshold, comes into close proximity with the transmitter when the door is fully closed. This proximity allows for efficient wireless power transfer from the transmitter to the receiver without requiring direct physical contact or precise alignment, relying instead on the close spatial relationship facilitated by the door's closing action.

In one exemplary use, the garage door threshold warmer 1000 is installed on a standard residential garage door 4000. The seal 3000 with embedded heating element 2000 is affixed to the bottom edge of the door 4000. The wire system is then installed, with the first wire 5100 routed along the side bracket of the door 4000 and aligned with the second wire 5200 via the connectors 5150, 5250. The second wire 5200 is engaged with a power source. Upon closing the garage door 4000, the connectors 5150, 5250 engage, activating the heating element 2000. The door's subsequent opening results in disconnection, thereby deactivating the heating element. This configuration protects the components from mechanical stress and potential damage due to vehicular traffic, as the connectors are elevated and laterally positioned away from the direct path of vehicles entering or exiting the garage. The lateral positioning on the side bracket not only ensures an unobtrusive installation, preserving the visual integrity of the garage environment.

Figure 3:
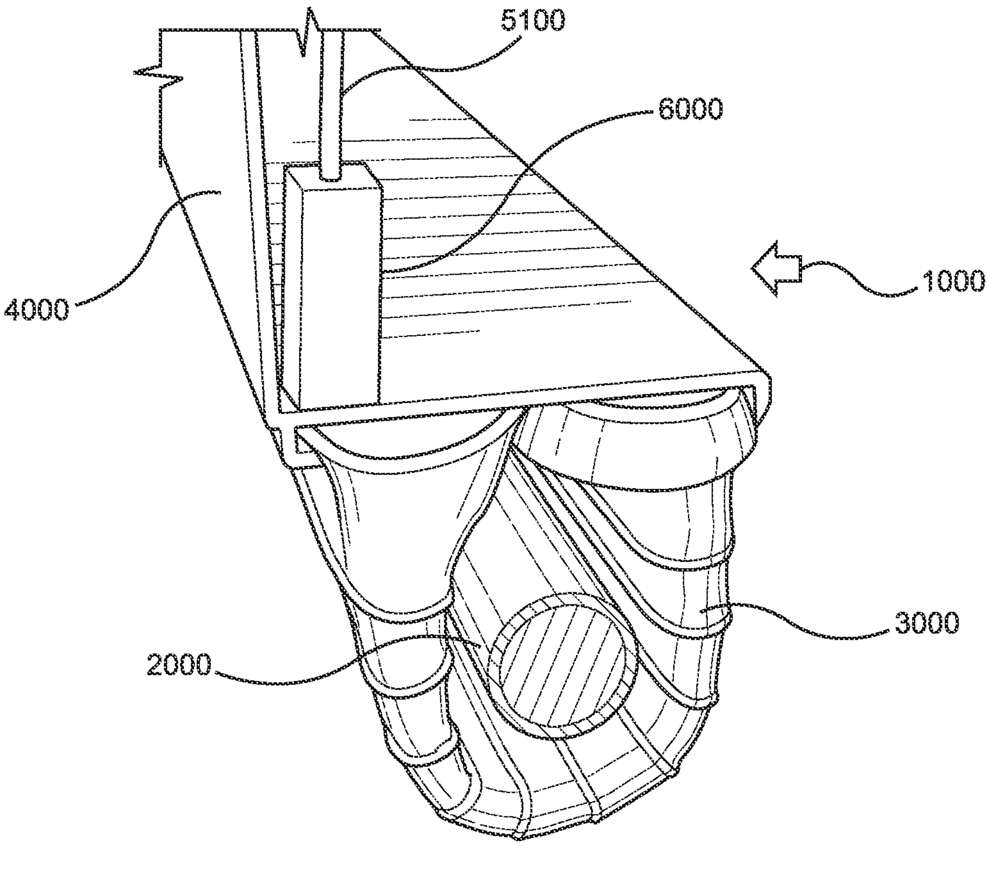
FIG. 3 shows a side perspective view of one embodiment of the heating element positioned within the seal of the garage door threshold warmer.

Referring now to FIG. 3, there is shown a side perspective view of one embodiment of the heating element positioned within the seal of the garage door threshold warmer. In the shown embodiment, the electric heating element 2000 within the seal 3000 comprises a resistive heating wire adapted to provide efficient and uniform heat distribution along the entire seal 3000. This heating element 2000 is fully encased within the seal 3000 with a portion of the heating element 2000 that is accessible to facilitate connection to a power source via the first wire 5100. The heating element 2000 is designed to activate only when the garage door 4000 is in a closed position, effectively melting any ice that may cause the door to adhere to the garage floor or prevent ice from forming along the seal 3000. Thus, the garage door threshold warmer 1000 prevents damage and ensuring operational integrity of the door 4000.

In alternative embodiments, the heating element 2000 may comprise a heating panel, an infrared heating element, or other types of devices that provide heat. In one embodiment, the garage door threshold warmer 1000 includes a control unit 6000 configured to regulate the output of the heating element and provide user-friendly controls. The control unit includes a sensor for detecting the temperature of the heating element and threshold. A regulatory mechanism uses the sensor to adjust the heating output in response to real-time temperature feedback. This is used to determine whether to activate or deactivate the heating element, thus ensuring the system's operation is both necessary and energy-efficient. The control unit further includes a manual on/off switch configured to provide a user with the ability to override automatic functions. A timer is also integrated and configured to operate the heating element for specific operating intervals.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A garage door threshold warmer, comprising:

an electric heating element disposed within a seal, the seal disposed at a lower end of a garage door and configured to form a seal between the garage door and a floor;

wherein the electric heating element is configured to heat the seal and the floor in close proximity to the lower end of the garage door when the garage door is in a closed configuration;

a wire system comprising a first wire and a second wire:

the first wire extending from the electric heating element and configured to extend past a perimeter of the garage door, wherein the first wire comprises a first connector;

the second wire comprising a second connector adapted to removably engage the first connector to provide electrical power to the heating element, wherein the second wire is adapted to be in electrical communication with a power source.

2. The garage door threshold warmer of claim 1, wherein the first and second connectors are mating connectors.

3. The garage door threshold warmer of claim 1, wherein a closed configuration, the garage door is closed with the floor and the first and second connectors are coupled and configured to provide electrical power to the heating element.

4. The garage door threshold warmer of claim 1, wherein an open configuration, the garage door is open from the floor, wherein the first and second connectors are uncoupled and no electrical power is provided to the heating element.

5. The garage door threshold warmer of claim 1, wherein a closed configuration, the garage door is closed with the floor and the first and second connectors are coupled and configured to provide electrical power to the heating element and wherein an open configuration, the garage door is open from the floor, wherein the first and second connectors are uncoupled and no electrical power is provided to the heating element.

6. The garage door threshold warmer of claim 5, wherein the first and second connectors are mating connectors.

7. The garage door threshold warmer of claim 6, wherein the first and second connectors are vertically aligned such that as the garage door transitions between the open and closed configuration, the connectors decouple and couple, respectively.

8. The garage door threshold warmer of claim 6, wherein the first connector comprises a cone and the second connector is a plug, wherein the cone is adapted to fit around the plug to form the electrical connection in the closed configuration.

9. The garage door threshold warmer of claim 1, wherein the garage door comprises a side bracket having bearings that engage a track mounted along lateral sides of the garage door, wherein the first connector is affixed to the side bracket of the garage door.

10. The garage door threshold warmer of claim 9, wherein the first connector faces towards the second connector, wherein the first and second connectors are vertically aligned such that as the garage door transitions between the open and closed configuration, the connectors decouple and couple, respectively.

11. The garage door threshold warmer of claim 10, wherein a closed configuration, the garage door is closed with the floor and the first and second connectors are coupled and configured to provide electrical power to the heating element and wherein an open configuration, the garage door is open from the floor, wherein the first and second connectors are uncoupled and no electrical power is provided to the heating element.

12. The garage door threshold warmer of claim 1, wherein the seal comprises a flexible, heat-resistant material forming an interior volume sized to receive the heating element.

13. The garage door threshold warmer of claim 12, wherein the electric heating element is a resistive heating wire that spans the entire length of the seal adapted to provide uniform heat distribution across the garage door threshold.

* * * * *